Feb. 28, 1928.
G. H. HASEY
FOUNDRY FLASK
Filed July 7, 1927
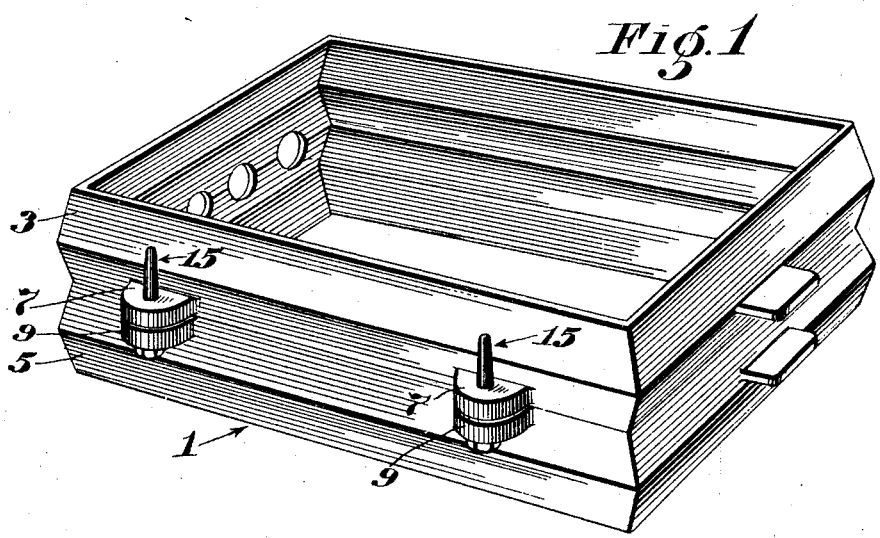
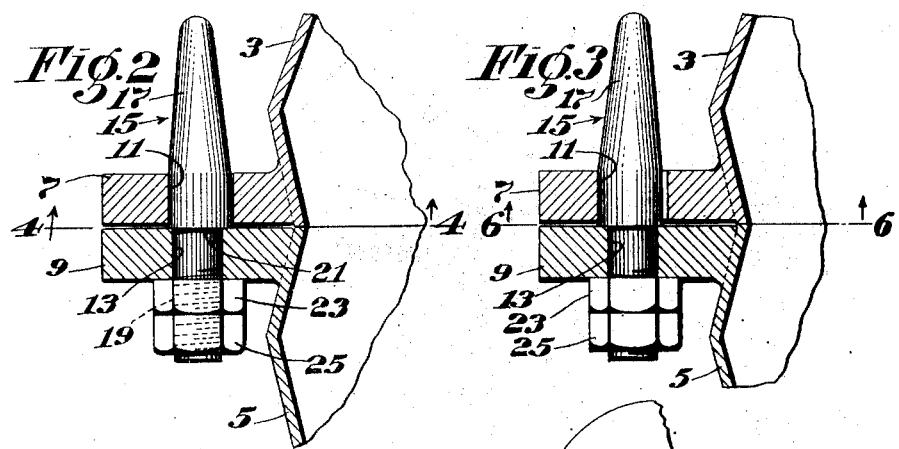
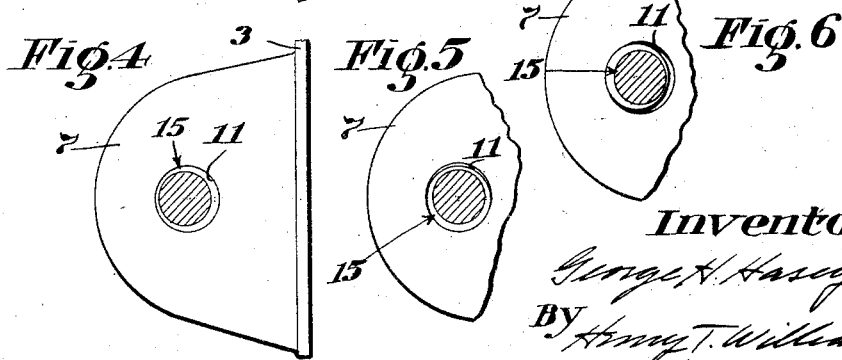
Inventor;
George H. Hasey
By Henry T. Williams
Attorney Patented Feb. 28, 1928.

1,660,966

UNITED STATES PATENT OFFICE.

GEORGE H. HASEY, OF MALDEN, MASSACHUSETTS.

FOUNDRY FLASK.

Application filed July 7, 1927. Serial No. 203,937.

This invention relates to foundry flasks.

The usual flask comprises a drag and a cope provided with pairs of ears having holes therein, each pair being provided with a dowel on one entered through the hole in the other and intended to hold the cope in registration with the drag.

These flasks receive hard usage, they are thrown on the sand pile, they are rapped with a vibrator to free sand therefrom and otherwise maltreated. Also sand will get in between the dowels and the holes through which they extend with abrasive action. The consequence is that the dowels and holes become worn, and there is lost motion between them, so that castings formed in the flask are liable to be one sided or show a jog at the joint or parting.

The aim and purpose of the present invention, therefore, is to provide a flask with simple and effective means for holding the cope in registration with the drag and having provision for adjustment to compensate for any lost motion resulting from wear on the parts. These flasks vary greatly in size and shape and some of them are expensive. By the use of the holding means of the present invention the life of the flask may be materially prolonged with consequent economy.

The character of the invention may be best understood by reference to the following description of an embodiment thereof shown in the accompanying drawing, wherein:

Fig. 1 is a perspective view of the flask;

Fig. 2 on an enlarged scale is a sectional view showing one of the dowels in one of its positions of adjustment;

Fig. 3 is a view similar to Fig. 2 showing the dowel in a different position of adjustment;

Fig. 4 is a section taken on line 4—4 of Fig. 2;

Fig. 5 is a sectional view showing a portion of one of the ears, and a dowel in a position of adjustment intermediate the positions of adjustment shown in Figs. 2 and 3; and Fig. 6 is a section taken on line 6—6 of Fig. 3.

Referring to the drawing, 1 (Fig. 1) designates a flask comprising parts including a cope 3 and a drag 5 formed of cast iron or other suitable material. The cope has four ears 7 projecting therefrom, and the drag has four ears 9 projecting therefrom, said ears being preferably formed integral with the cope and drag. The ears of the cope are in superposed relation with respect to the ears of the drag. The cope ears have holes 11 therein eccentric with relation to holes 13 in the drag ears, the holes 11 being somewhat larger than the holes 13.

Each pair of ears is provided with a dowel 15 comprising a smooth portion 17 and a shank 19, the smooth portion being eccentric with respect to the shank. A shoulder 21 is at the juncture of the two. The shank has a smooth portion which projects through the drag ear hole, and a threaded portion receiving a nut 23 and a lock nut 25. The construction is such that when the nut 23 is set up, the drag ear will be gripped between the shoulder 21 and the nut 23.

When it is desired to assemble the cope with the drag, the cope ears 7 are slid down over the dowels and come into engagement with the drag ears when the cope meets the drag. When the flask is new, the dowels may each be in the position shown in Figs. 2 and 4, but when the dowels and the cope ear holes become worn, the dowels may be given a rotative adjustment to compensate for the wear so that the cope will always be positively held to the drag and there will be no liability of movement of the cope relatively to the drag. Hence imperfect castings from such cause are avoided.

To accomplish this adjustment is is merely necessary to release nuts 23 and 25 and turn the dowels until the lost motion between the dowels and the cope ear holes is taken up. The smooth portions of the dowels which are eccentric to their shanks may engage merely outer portions of the cope ear holes. It is not necessary that they shall engage the entire surfaces of said holes. When the dowels and cope ear holes have become considerably worn, each dowel may be adjusted to the position shown in Figs. 3 and 6 in which the dowel has been rotatively adjusted from its position shown in Figs. 2 and 4 through an arc of 180°. An intermediate adjustment is shown in Fig. 5.

There are ear and dowel devices on opposite sides of the flask, in the present instance, four in number. Since these devices on both sides are similar, it will suffice to show them on merely one side of the flask.

While the flask shown herein comprises merely a cope and a drag, it will be understood that the invention is applicable to flasks having a cheek or cheeks between the cope and drag, the dowels being suitable to hold all of the parts of the flask against lateral relative shifting.

These dowels are simple and cheap in construction, and easily applied to the ears of the flask. The adjustments may be quickly and easily made, and the dowels will desirably prolong the useful life of the flask.

It will be understood that the invention is not limited to the specific embodiment shown, and that various deviations may be made therefrom without departing from the spirit and scope of the appended claims.

What is claimed is:—

1. A foundry flask comprising a cope and a drag, ears projecting from both having holes therein, the hole in the cope ear being eccentric to the hole in the drag ear, a dowel having a shank in the drag ear hole with a threaded portion projecting beyond said hole, said dowel having a smooth portion for passage through the cope ear hole, said smooth portion being eccentric to the shank, and a nut on the threaded portion of the shank adapted to be set up to confine the drag ear between the nut and the shoulder at the juncture of the eccentric portion and the shank, said dowel being rotatively adjustable in the drag ear hole to compensate for wear on the smooth portion of the dowel or on the cope ear hole.

2. A foundry flask comprising parts having portions with holes therein, the hole in one being eccentric to the hole in the other, a dowel having a shank and a portion eccentric to the shank projecting through said holes respectively, and a nut threaded on the shank, said dowel having a shoulder at the juncture of the eccentric portion with the shank, and said nut and shoulder being adapted to confine between them the portion having the hole through which the shank extends.

3. A foundry flask comprising superposed parts, and means at opposite sides thereof for preventing relative lateral shifting thereof, each of said means comprising portions of adjacent parts having holes in eccentric relation, a dowel having a shank in one of the holes and a portion eccentric to the shank in the other hole, said dowel having a shoulder at the junction of its eccentric portion with the shank, and a nut on the shank cooperating with the shoulder to confine between them the portion having the hole occupied by the shank, said dowel being rotatively adjustable to take up lost motion between the parts.

GEORGE H. HASEY.